(No Model.)  2 Sheets—Sheet 1.
C. & F. QUINTUS, J. RITCHIE, P. QUINTUS, P. BEEBE & F. LUKERMANN.
THRESHING MACHINE.
No. 573,916.  Patented Dec. 29, 1896.
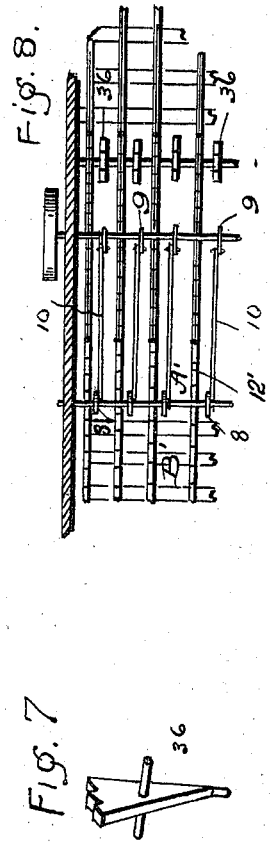
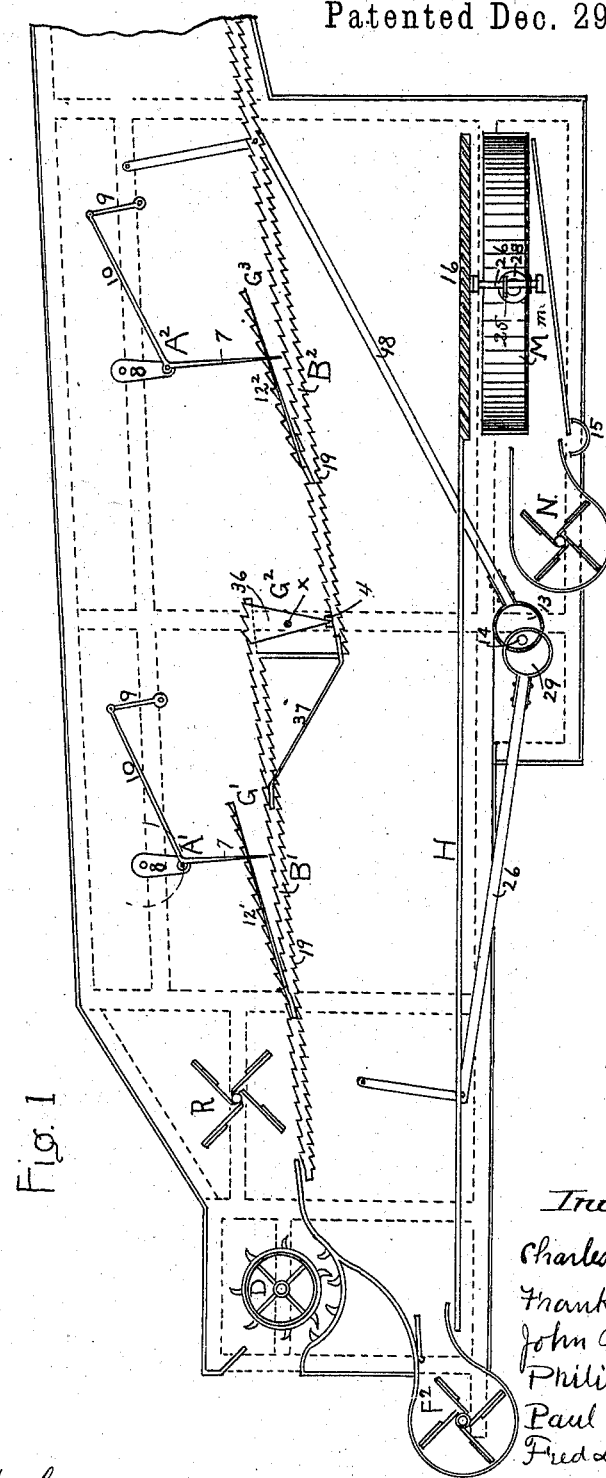
Witnesses:
Howard H Hahn
A. E. Weary
Inventors:
Charles Quintus
Frank Quintus
John Ritchie
Philip Beebe
Paul Quintus
Fred Lukermann
By W. Henry MacDougal
Attorney (No Model.) 2 Sheets—Sheet 2.

C. & F. QUINTUS, J. RITCHIE, P. QUINTUS, P. BEEBE & F. LUKERMANN.
THRESHING MACHINE.

No. 573,916. Patented Dec. 29, 1896.

Witnesses
Howard H Hahn
A. L. Weary

Inventors:
Charles Quintus
Frank Quintus
John Ritchie
Philip Beebe
Paul Quintus
Fred Lukermann By W. Henry Mac Dougal
Attorney.

UNITED STATES PATENT OFFICE.

CHARLES QUINTUS, FRANK QUINTUS, JOHN RITCHIE, PAUL QUINTUS, PHILIP BEEBE, AND FREDERIC LUKERMANN, OF FREEPORT, ILLINOIS.

THRESHING-MACHINE.

SPECIFICATION forming part of Letters Patent No. 573,916, dated December 29, 1896.

Application filed May 31, 1895. Serial No. 551,317. (No model.)

*To all whom it may concern:*

Be it known that we, CHARLES QUINTUS, FRANK QUINTUS, JOHN RITCHIE, PAUL QUINTUS, PHILIP BEEBE, and FREDERIC LUKERMANN, citizens of the United States, and residents of the city of Freeport, in the county of Stephenson and State of Illinois, have invented certain new and useful Improvements in Threshing-Machines and Separators, of which the following is a full, clear, and exact description, reference being had to the drawings accompanying the same.

The object of our invention is to provide means for effectually separating the grain from the straw and to prevent the straw from becoming matted or clogged in its passage through the machine, also to provide an improved method of cleaning and brushing the grain and of driving the cleaning and separating mechanism of the machine independent of the cylinder. These objects are attained by the construction and arrangement of devices and instrumentalities herein described, and shown in the accompanying drawings, in which—

Figure 2:
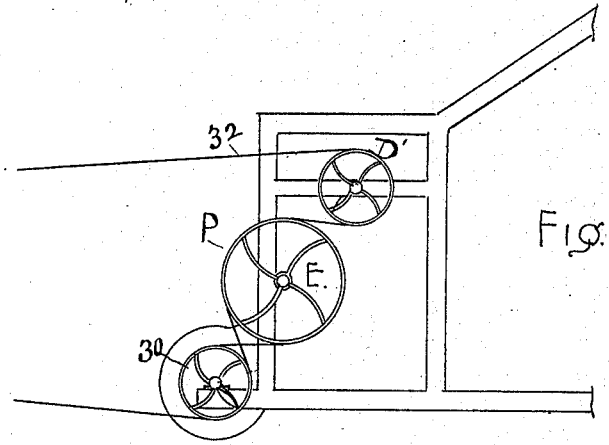
Figure 3:
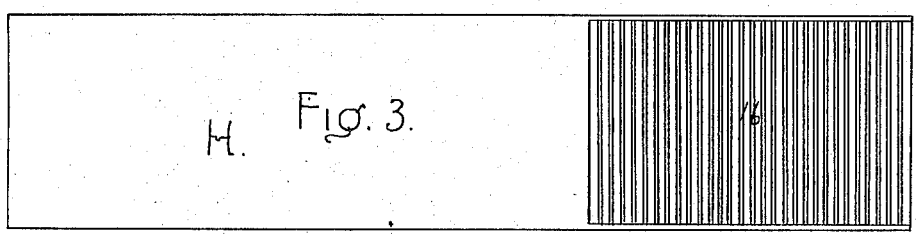
Figure 5:
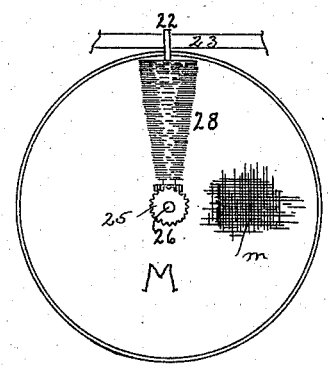
Figure 6:
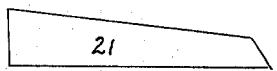

Figure 1 is a sectional longitudinal side view of our improved thresher. Fig. 2 is an external side view of our machine, showing our improved system of belting. Fig. 3 is a top plan view of the grain-carrier of our machine. Fig. 5 represents the revolving shoe. Fig. 6 shows the bevel grain-agitator. Fig. 7 is a detail view of one of the rakers. Fig. 8 is a sectional plan of a portion of the machine, showing the relative positions of the rakers with respect to the straw-carriers.

In many, if not all, of the threshing-machines now in use the mechanism for separating the grain from the straw is imperfect and the straw tends to clog in its passage through the machine. These defects are caused partially by the want of effective rakers on the upper surface of the straw and partly because the jointed straw shakers and conveyers heretofore made were constructed to operate in reverse directions, so that the force exerted on the straw by one part of the conveyer is neutralized by the other. To overcome these defects, we have provided—

First, two sets of automatic rakers $A'$ $A^2$, composed of vertical reciprocating teeth 7 7, mounted loosely on crank-shafts 8 8 and adapted to receive reciprocating motion from rock-shafts 9 9 and connecting-arms 10 10. In operation the teeth of the rakers describe about a quarter-circle. As the crank raises the teeth or prongs they are pushed forward over the surface of the straw, and as the crank descends the teeth engage the straw, tear it apart, shake it, and push it over the falls or steps $G'$ and $G^3$ of the shaker. The teeth are then withdrawn from the straw in an almost perpendicular line.

Second, the straw-shaker, formed with two portions $B'$ $B^2$, the rear end of the former being situated above the forward end of the latter, whereby there is formed a fall or step, each section having a deflected sectional apron $12'$ $12^2$, which coöperates with the reciprocating rakers $A'$ $A^2$ in shaking, spreading, and carrying the straw forward.

The shaker is operated by eccentrics 13, mounted on shaft 14, and connecting-rods 18, and is constructed and arranged to reciprocate its entire length in the same direction, thus giving a united impetus to the straw along the entire length of the machine and furnishing an effective means whereby all clogging is prevented, the straw kept loose, and the grain thoroughly eliminated, as hereinafter described.

Successful threshing can only be accomplished by devices which completely separate every particle of grain from the straw. To insure this result, it is necessary not only that the straw be kept loose as it passes through the machine, but that it be thoroughly shaken and agitated. Our improved straw-shaker not only acts directly on the straw, but is so constructed and arranged that a series of falls or steps $G'$ $G^2$ $G^3$ are provided, over which the straw is precipitated in its passage from the cylinder to the discharge-chute. Thus as the straw passes from the cylinder D it is partially carried and partially drawn by the reciprocating teeth over the deflected apron $12'$. It then falls on the section $B'$, is carried forward, and precipitated on section $B^2$. Thence it is carried up the deflected apron $12^2$ and again precipitated on the section $B^2$ to be discharged.

The shaker-sections are connected by the oscillating rakers 36 and the brace 37. It will be seen that the process of separating the grain from the straw is thus perfected while the straw is conveyed in a direct line through the machine.

The inclined aprons or extensions 12' and 12² are slotted to permit the teeth of the overhanging rakers A' to work through them, as indicated in Fig. 1. The sections B' and B² of the shaker are slotted, as is usual, to permit the grain to descend freely on the grain-carrier.

The oscillating grain-carrier H of our improved thresher extends from the throat of the direct-blast fan F² to the extreme end of the machine and is operated by the pitman 26 and the eccentric 29, mounted on the shaft 14. Directly in the rear of the grain-spout 15 the grain-carrier is provided with a slotted screen 16, through which a volume of grain can freely pass. Below this slotted screen a circular revolving shoe M is provided in the direct path of the blast of the cleaning-fan N. Inside the rim of the shoe and above the sieve $m$ thereof we have constructed a circular casing, which is provided with two or more beveled grain-agitators 21, which serve to keep the grain in constant motion on the surface of the sieve. As the sieve revolves, the agitators sweep the surface of the sieve, and spread the grain evenly to the cleaning-blast. We prefer, however, to provide a rotary cone-shaped brush 28 as a substitute for the beveled agitator. This brush is so driven that its surface which is in engagement with the sieve-surface travels in a direction opposite to that of the part of the sieve which it engages, and so operates to remove every particle of dust from the grain and prepares it to be carried away with the chaff. It also serves to keep the grain moving toward the center of the revolving shoe, and thus counteracts the centrifugal force exerted by the revolving shoe on the grain. The brush is mounted on a shaft 22, journaled in a stationary bearing 23 at the rim of the shoe and in another bearing 24 on the vertical shaft of the shoe 26, and is operated by the bevel-gears 25. When the shoe is put in motion, the brush revolves and cleans and distributes the grain evenly over the sieve.

The direct-blast fan F², which is a special feature of our invention, is placed below the cylinder, as shown in Fig. 1. The wind-trunk, which is composed of the thresher-frame and the straw-carriers above and the grain-carriers below, directs the blast straight through the machine beneath the straw-carrier or shaker B' B² and along the upper surface of the grain-carrier H. By this method of constructing and operating the fan F² a modulated blast is created, which sweeps the entire length of the grain area of the machine, being strongest at the cylinder, where the greatest volume of grain descends, and diminishing in force toward the rear end of the thresher, where the grain-fall is limited. Another important function which this direct blast performs is that of aiding in loosening and propelling the straw on the shaker above and driving the grain toward the shoe along the surface of the grain-carriers below.

In machines of the class herein described the entire mechanism of the thresher is driven from the cylinder-pulley. In operation this has been found to possess many disadvantages. In a strong wind, for instance, blowing from a point at right angles to the direction of the belt, the belt is frequently blown off. Besides, on account of imperfect or careless feeding the cylinder is often clogged, the belt slips, and the operation of the thresher becomes suspended. Our improved method of belting not only avoids these defects, but provides means whereby the belt is absolutely prevented from blowing off. All the mechanism of the thresher is run independently of the cylinder, and in case of clogging the thresher will clear itself automatically. This important feature of our invention is accomplished by placing a counter-shaft E between the pulley D' on the shaft of the cylinder D and the pulley 30 on the shaft of the direct-blast fan F². On this shaft E a drive-pulley P of suitable size is mounted, and the belting 32 is applied as shown in Fig. 2.

The shaker B' B² and the grain-carrier H operate in opposite directions, so that the machine when threshing has little, if any, of that shaking or vibratory motion so common in other machines of this class. This result is attained by mounting the eccentrics 29 13 on a single shaft 14, the throws of the eccentrics being set opposite each other, so that when the shaker B' B² is thrown backward the grain-carrier H is thrown forward, and vice versa. By this mode of operation the equipoise of the machine is always maintained.

The oscillating rakers 36 are rigidly mounted on a cross-shaft X, which is journaled in the frame of the machine on each side. The upper ends of these rakers are provided with teeth, which project through the openings in the end of the upper section of the straw-shaker B'. The lower ends of the rakers are pointed, the pointed ends being inserted loosely in a groove 4 in the end of the shaker-section B². As the shaker moves toward the cylinder the lower ends of the rakers are pushed in the same direction and the teeth on the other end of the rakers are pushed in the opposite direction and carry the straw off the end of the section B', as shown by the dotted line on Fig. 1. The shaft is inserted at the center of the rakers 36, forming a pivot on which the rakers operate.

Having thus described our invention, what we claim, and desire to secure by Letters Patent, is—

1. The combination of the shaker formed with sections between which is a step or fall, the inclined extensions or aprons carried by the shaker, the rakers mounted above the said extensions or aprons, and means for operating the rakers, substantially as set forth.

2. The combination, in a threshing-machine, of the framework, the shaker adapted to reciprocate as a whole, and provided with the inclined aprons or extensions, the reciprocating rakers above the said inclined aprons or extensions, crank-shafts on which such rakers are mounted, rock-shafts for operating such crank-shafts, the cylinder, and means for operating the shaker, substantially as set forth.

3. The combination in a threshing-machine, of a shaker comprising two sections $B'$ and $B^2$ with a step or fall between their adjacent ends, and the oscillating rakers $G^2$ pivoted between the ends of such sections, and having their lower ends connected with the lower section of the shaker and their upper ends arranged at the end of and substantially in the plane of the upper section, whereby they are operated to feed the straw from the upper to the lower section as the shaker is vibrated, substantially as set forth.

4. The combination, in a threshing-machine, of a shaker comprising two sections, with a step or fall between their inner or adjacent ends, and each section being provided with an inclined apron or extension $12'$, $12^2$, forming the steps or falls $G'$ and $G^3$ for the straw, and the oscillating rakers 36 pivoted on a shaft between the inner adjacent ends of the shaker-sections, and having their lower ends connected with the lower section, and their upper ends toothed whereby they operate to feed the straw from one to the other section of the shaker, substantially as set forth.

5. In a threshing-machine, the combination of the grain-carrier, means for operating it, a revolving shoe having a sieve-surface upon which the grain is delivered, a brush extending from the center to one side of the sieve-surface of the shoe, and means for turning the shoe and the brush, substantially as set forth.

6. In a threshing-machine the combination of the straw-shaker, the grain-carrier, a revolving shoe having a sieve-surface upon which the grain is delivered, and a cone-shaped brush 28 mounted above the said sieve-surface, substantially as set forth.

7. The combination in a threshing-machine, of a straw-shaker, a grain-carrier upon which the grain falls as it separates from the straw, a revolving shoe mounted on a vertical axis, and having a sieve-surface, upon which the grain is delivered, a cone-shaped brush 28 above the said sieve-surface, the gearing for driving the shoe and the brush, and the cleaning-fan N arranged to blow a blast through the sieve-surface of the shoe, substantially as set forth.

CHARLES QUINTUS.
FRANK QUINTUS.
JOHN RITCHIE.
PAUL QUINTUS.
PHILIP BEEBE.
FR. LUKERMANN.

Witnesses:
FRANK NAMPEL,
J. C. SCOTT.